United States Patent [19]

Raczek

[11] 3,768,142

[45] Oct. 30, 1973

[54] FORMING A METAL AND FOAM PLASTIC COMPOSITE

[75] Inventor: Thaddeus Anthony Raczek, Apalachin, N.Y.

[73] Assignee: International Business Machines Corporation, Armonk, N.Y.

[22] Filed: Dec. 20, 1971

[21] Appl. No.: 210,065

[52] U.S. Cl............................ 29/421, 72/60, 72/364
[51] Int. Cl............................................. B21d 26/04
[58] Field of Search........................... 29/421; 72/60

[56] References Cited
UNITED STATES PATENTS

| | | |
|---|---|---|
| 3,340,101 | 9/1967 | Fields, Jr. et al. ................. 148/11.5 |
| 3,166,831 | 1/1965 | Keith .................................... 29/421 |
| 2,744,042 | 5/1956 | Pace ..................................... 29/421 |
| 3,613,495 | 10/1971 | Podgursky ........................... 29/421 |
| 3,390,214 | 6/1968 | Woods................................. 264/45 |

*Primary Examiner*—Richard J. Herbst
*Attorney*—G. R. Gugger et al.

[57] ABSTRACT

A method of fabricating a metal-clad polymeric part by shaping or forming the metal to the contour of the mold cavity and using heat expandable polymeric foam material to exert the necessary pressure to form the metal in one operation.

2 Claims, 4 Drawing Figures

PATENTED OCT 30 1973 3,768,142

FORMING A METAL AND FOAM PLASTIC COMPOSITE

BACKGROUND OF THE INVENTION

Thermoplastic materials such as ABS can be compounded with heat activated blowing agents. These materials can then be used in expansion casting systems to mold parts by filling the mold cavity with the material, closing the cavity and heating. The blowing agent creates an internal pressure which foams the melted polymeric material to the shape of the mold cavity. Upon cooling the mold, the finished part can be removed.

CYCOLAC JS (a registered trademark of Borg-Warner Corporation) is a structural foam grad of CYCOLAC brand ABS and is processed by the expansion casting technique. This thermoplastic is supplied in pellet form and incorporates, as an integral part of the pellet, a heat-sensitive chemical blowing agent that causes expansion and subsequent conformation of the molten plastic material to contours of the mold cavity. Expansion casting may be defined as the seqential heating and cooling of closed molds containing, for example, CYCOLAC JS. When exposed to heat, the built-in blowing agent decomposes emitting an inert gas that causes the softened pellets to expand and fuse together forming structurally sound lightweight cellular constructed parts.

In applications where a metal-clad polymeric composite is desired such as, for example, a metal-clad polymeric machine cover which provides EMC shielding, the practice has been to employ a two-step operation involving two seperate processes wherein the polymeric material is molded separately and a metal sheet is formed separately and then they are bonded together to form the metal clad composite. The use of two separate processes is not only time consuming and costly but two seperate operations are required and the dimensional matching of the polymer and the metal is extremely difficult to obtain. It would be much more advantageous to produce the composite part in a one-step operation where matching of separate parts is not required.

SUMMARY OF THE INVENTION

The present invention makes it possible to obtain the desired metal-clad polymeric composite in a one-step operation by making use of the pressure from the foaming agent to form the metal sheet to the shape or contour of the mold. The metal must be formable at the processing pressures and temperatures of the foaming material. The metal shaping is obtained by using the zinc aluminum alloy referred to as superplastic and using an ABS foaming material such as CYCOLAC JS. The CYCOLAC JS can be molded by heating at 550° F. For 30 minutes, which is the softening temperature of the superplastic alloys. The limiting factor is the pressure necessary to form the metal and the pressure created by the heated polymeric foam material. Adhesion between the metal and polymeric material is obtained by applying an adhesive layer to the metal.

The present novel one-step forming method which embodies the use of foam as a forming tool and then provides an end use as an insulator or an acoustic muffler results in a new technology which provides an inexpensive approach to tooling as well as meeting the electrical requirements of EMC shielding on external covers and also acoustical baffling on machines which emit noise, such as printers. The present method may also be used advantageously to produce metal-clad polymeric composites for uses, such as reinforcing, strengthening, solvent resistance and heat conductance.

It is, then, the primary object of the present invention to provide a novel and improved method for producing a metal-clad polymeric composite.

A further object of the present invention is to provide a novel and improved method for producing a metal-clad polymeric composite in one forming operation.

A still further object of the present invention is to provide a novel and improved method which uses an ABS foaming material and a superplastic to produce a metal-clad polymeric composite in one forming operation.

A further object of the present invention is to provide a novel and improved method which makes use of foam as a forming tool and then provides an end use as an insulator or an acoustic muffler.

The foregoing and other objects, features and advantages of the invention will be apparent from the following more particular description of preferred embodiments of the invention as illustrated in the accompanying drawings.

DESCRIPTION OF PREFERRED EMBODIMENTS

Superplasticity in metals has been recognized for some time and this phenomenon is characterized as having especially low values of resistance of deformation and extremely high plasticity as compared with other alloys and pure components of a system. Examples of superplastic alloys, such as zinc-aluminum alloy, and the forming thereof by application of fluid pressure are discussed in U.S. Pat. No. 3,340,101.

In carrying out the present invention, use was made of a superplastic alloy and it was discovered that this type of alloy could be formed to the shape or contour of a mold by using the pressure from a heat expandable polymeric foam material. Referring to the embodiment shown in FIGS. 1 and 2, a plurality of metal parts 10 were placed in the bottom cavity of an 8 X 8 inch square by 0.5 inch high aluminum box mold 11. A .020 inch thick sheet of super-plastic alloy 12, preferrably zinc-aluminum, was clamped in the mold to overlie the metal parts. The Borg-Warner CYCOLAC JS foam material 13 in pellet form was then loaded into the cavity on the opposite side from the superplastic sheet and metal parts and the box mold 11 was clamped together.

Figure 1:
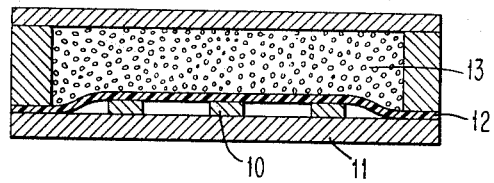
FIG. 1 is a sectional view showing a mold loaded with metal parts, a superplastic sheet and a polymeric foam material.
Figure 2:
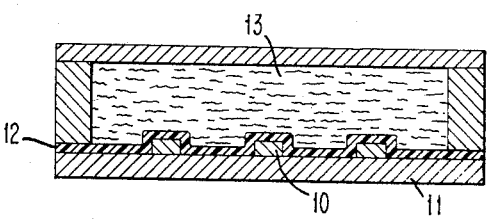
FIG. 2 is a sectional view showing a mold of FIG. 1 after the forming operation.

The mold was then heated for 30 minutes at 550° F. by any suitable means such as, for example, a circulating hot air oven which is the simplest and most common method used. Upon heating, the built-in blowing agent in the foam material decomposes, emitting an inert gas that causes the softened pellets to expand and fuse together and at the same time exerting sufficient pressure on the superplastic sheet 12 to form the sheet around the metal parts 10, as shown in FIG. 2. After the 30 minute heating cycle, the mold is allowed to cool gradually from 10 to 15 minutes after which it may be further cooled by a water shower or spray. The parts were removed from the mold and since no adhesive was used to bond the materials, there were two separate parts: the mass of solid polymeric material 13 and the formed superplastic metal sheet 12 with the metal parts 10 imbedded therein. The embodiment shown in FIGS. 1 and 2 illustrates that a piece of superplastic metal sheet can be formed by using the CYCOLAC JS ABS foaming material.

Figure 3:
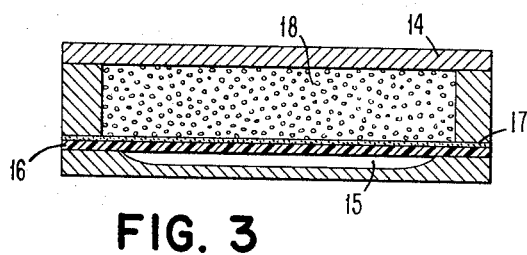
FIG. 3 is a sectional view showing a mold loaded with a superplastic sheet, a film of adhesive and a polymeric foam material.
Figure 4:
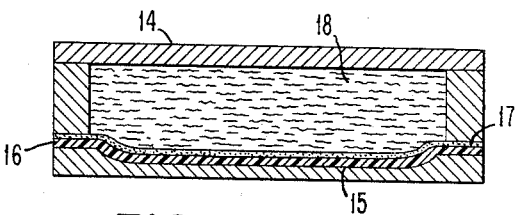
FIG. 4 is a sectional view showing the mold of FIG. 3 after the forming operation to produce the metal-clad polymeric composite.

The above principle was used in the second embodiment shown in FIGS. 3 and 4 to produce a metal-clad polymeric part in one molding operation. In this embodiment the bottom portion of the aluminum box mold 14 is dish-shaped to provide a central cavity 15. As shown in FIG. 3, a sheet of superplastic alloy, 16, such as zinc-aluminum, is clamped in the mold to overlie the cavity 15 along with a 0.005 to 0.010 inch thick film or coating 17 of a suitable thermoplastic adhesive which is positioned on top of the superplastic sheet. The Borg-Wagner CYCOLAC JS foam material 18 in pellet form was then loaded into the mold on top of the adhesive and the box mold 14 was together.

The mold was then heated for 30 minutes at 550° F. and, as previously described, the softened foam pellets expanded and fused together. At the same time they exerted sufficient pressure on the superplastic sheet 16 to form the sheet to the contour of the mold and cavity 15, as shown in FIG. 4. After a cooling cycle, the mold was emptied and since the foam material and the superplastic alloy were bonded together by the adhesive coating 17 there was produced a solid metal-clad polymeric composite.

Superplastic alloys 0.020 and 0.010 inch thick have been formed using the above described technique. Other metals which could be used include, for example, wrinkled aluminum and expandable screening. For applications such as metal-cladding polymeric covers for EMC shielding, a very thin 0.001 to 0.010 inch thick metal skin could be sufficient. Also, by incorporating suitable blowing agents in the various thermoplastics, such as a modified polypropylene oxide, materials other than ABS could be used in the process.

It will be recognized that a novel and important feature of the present invention is that the polymeric material functions as the pressure medium and, secondly, becomes part of the composite structure to accomplish the basic objective of obtaining a metal-clad polymeric structure with the polymeric material providing the structural strength.

While the invention has been particularly shown and described with reference to preferred embodiments thereof, it will be understood by those skilled in the art that various changes in form and details may be made therein without departing from the spirit and scope of the invention.

What is claimed is:

1. A method of forming a superplastic metal sheet which comprises:

providing a mold having a surface formed complementary to the shape desired to be formed;

placing a superplastic metal sheet of the type such as zinc-aluminum alloy adjacent said surface;

filling said mold with a heat expandable ABS foaming material; and heating the mold at a temperature of at least 550° F. for at least 30 minutes to soften the superplastic sheet and to cause the foaming material to expand and exert pressure against said sheet and surface to form the sheet to the desired shape.

2. A method for producing a metal-clad polymeric composite which comprises:

providing a mold having a surface formed complementary to the shape desired to be formed;

placing a superplastic metal sheet of the type such as zinc-aluminum alloy adjacent said surface;

providing a coating of thermoplastic adhesive on said metal sheet;

filling said mold with a heat expandable ABS foaming material; and heating the mold at a temperature of at least 550° F. for at least 30 minutes to soften the superplastic sheet and to cause the foam material to expand and exert pressure against said adhesive coating and sheet whereby the foam material and metal sheet are bonded together and formed to the desired shape.

* * * * *